No. 691,301. Patented Jan. 14, 1902.
E. L. TSCHANTRE.
ANIMAL TRAP.
(Application filed Apr. 10, 1901.)
(No Model.)
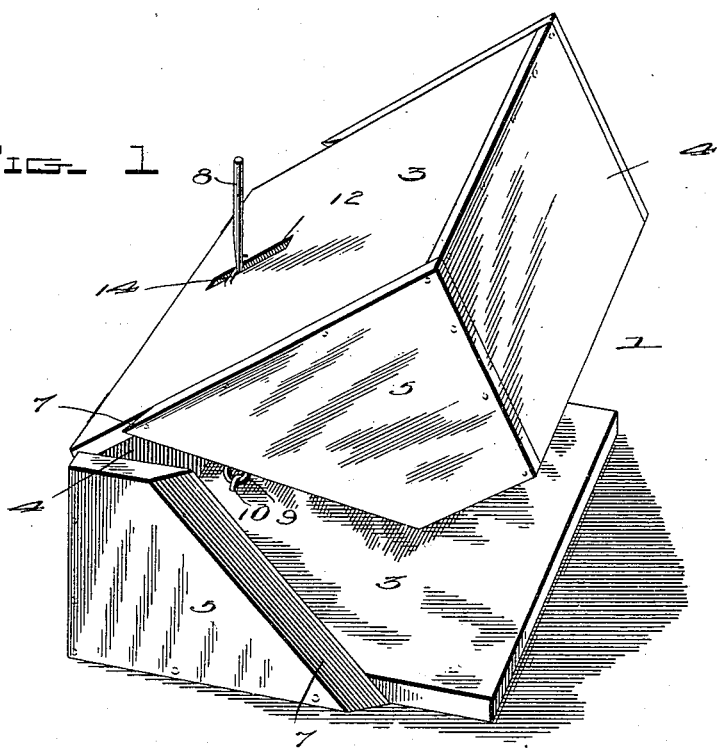
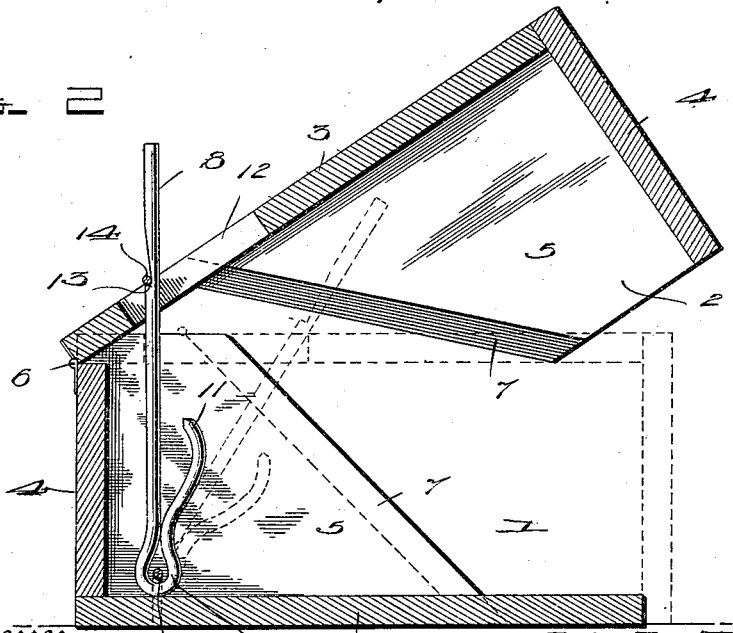

UNITED STATES PATENT OFFICE.

ERNEST L. TSCHANTRE, OF NEW YORK, N. Y.

ANIMAL-TRAP.

SPECIFICATION forming part of Letters Patent No. 691,301, dated January 14, 1902.

Application filed April 10, 1901. Serial No. 55,190. (No model.)

*To all whom it may concern:*

Be it known that I, ERNEST L. TSCHANTRE, a citizen of the United States, residing at New York, in the county of New York and State of New York, have invented new and useful Improvements in Animal-Traps, of which the following is a specification.

This invention relates to improvements in animal-traps, and has for its object to provide a mouse-trap which is simple of construction, efficient in operation, and adapted to be easily and cheaply manufactured.

The invention consists of certain novel features of construction, combination, and arrangement of parts, as will be hereinafter more fully described, and particularly set forth in the appended claims.

In the accompanying drawings, Figure 1 is a perspective view showing the trap set. Fig. 2 is a sectional view showing in full and broken lines the parts set for operation and retracted.

Referring now more particularly to the drawings, the numeral 1 designates the base, and 2 the hinged top, of the trap, which are similar in form and construction, each having a base or body portion 3, an end wall 4, and side walls or wings 5. The body portion 3 of the top 2 is united at its inner or rear end to the end wall 4 of the base-section of the trap by means of one or more hinges 6. The trap-box as thus constructed is rectangular in form and when the top section 2 is closed or swung downward forms a cage or inclosure within which the entrapped mice are held and prevented from escaping. The wings 5 constitute divided sides of the box and have their meeting edges 7 diagonal and beveled, so that when the top section 2 descends the beveled edges of its wings will engage the beveled edges of the corresponding wings on the base-section 1 and act as guides to cause said top section to assume its proper position. These wings, moreover, allow the top section to swing vertically in an arcuate path and form closed sides when the top section descends, through which no openings are afforded for the escape of the mice.

The hinged top section 2 is adapted to be held suspended in an inclined position, as shown in full lines in Figs. 1 and 2, and to be released to drop down to a horizontal position when a mouse nibbles or pulls at the bait by means of catch connections comprising a trip-rod 8, bent at its lower end to form an eye 9, pivotally connected to the base 3 of the base-section 1 by means of a staple 10 and a hook 11, projecting upwardly from said eye, which hook is adapted to receive the bait. The upper or free end of the rod 8 projects upwardly through a slot 12, formed in the body portion 3 of the top section 2, and is formed with a shoulder 13. This shoulder is adapted to engage a cross-bar 14, bridging the slot 12 and fixed to said portion 3 of the side section 2 to hold the said top section suspended, whereby the trap is set.

In operation it will be seen that when a mouse nibbles or pulls at the bait on the hook 11 the trip-rod 8 will be pulled forward and the shoulder 13 withdrawn from under the cross-bar 14, leaving the hinged top section 2 free to drop down upon the base-section 1 and confine the mouse, and when it is desired to release the confined mouse the trap may be held over a receptacle of water and the top section raised, and by so doing the mouse will fall into the water and drown.

My invention provides a simple, cheap, and effective construction of a trap which operates quickly, may be easily and conveniently set, and is not liable to get out of order.

Having thus fully described my invention, what I claim as new, and desire to secure by Letters Patent, is—

1. An animal-trap comprising a rectangular box or casing formed of corresponding base and top sections hinged together; the upper section being provided in its body portion with a slot; a cross-bar bridging said slot; and a trip-rod pivoted at its lower end to the base-section formed with a bait-receiving portion, and having its upper end projecting through said slot and provided with a shoulder to engage said cross-bar.

2. An animal-trap comprising a rectangular box or casing formed of corresponding base and top sections hinged together, the sides of the box being formed by wings on said sections which have diagonal beveled meeting edges; said top section being provided in its body portion with a slot; a crossbar bridging said slot; and a trip-rod pivoted at its lower end to the base-section and formed with a bait-receiving portion and having its upper end projecting through said slot and provided with a shoulder to engage said crossbar.

In testimony whereof I affix my signature in presence of two witnesses.

ERNEST L. TSCHANTRE.

Witnesses:
JACOB GOTTLOEB,
EDW. L. WATERBURY.